(12) United States Patent
Choquet

(10) Patent No.: US 12,468,323 B2
(45) Date of Patent: *Nov. 11, 2025

(54) SUBSIDIARY INTERACTION OF CONTROLLERS

(71) Applicant: Barksdale, Inc., Los Angeles, CA (US)

(72) Inventor: Pascal Choquet, Oberursel (DE)

(73) Assignee: Barksdale, Inc., Los Angeles, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,733

(22) Filed: Mar. 27, 2024

(65) Prior Publication Data

US 2024/0241531 A1    Jul. 18, 2024

Related U.S. Application Data

(63) Continuation of application No. 17/640,141, filed as application No. PCT/US2020/049199 on Sep. 3, 2020, now Pat. No. 11,953,923.

(60) Provisional application No. 62/896,055, filed on Sep. 5, 2019.

(51) Int. Cl.
*G05B 15/02* (2006.01)
*G05D 23/19* (2006.01)

(52) U.S. Cl.
CPC ......... *G05D 23/1931* (2013.01); *G05B 15/02* (2013.01); *G05D 23/1935* (2013.01)

(58) Field of Classification Search
CPC .. F24F 11/30; F24F 11/62; F24F 11/64; F24F 2110/10; F24F 11/46; G05B 2219/2614; G05B 13/021; G05B 19/0426; G05B 2219/2639

See application file for complete search history.

(56) References Cited

U.S. PATENT DOCUMENTS

| | | | |
|---|---|---|---|
| 4,701,598 A | 10/1987 | Cooper | |
| 4,959,834 A | 9/1990 | Aikawa | |
| 5,004,149 A * | 4/1991 | Narikiyo | F24F 11/76 236/49.3 |
| 5,183,998 A | 2/1993 | Hoffman | |
| 5,644,173 A | 7/1997 | Elliason | |
| 5,723,848 A * | 3/1998 | Bilenko | H05B 1/0244 219/486 |
| 5,796,936 A * | 8/1998 | Watabe | G05B 19/0428 358/1.9 |
| 6,411,857 B1 | 6/2002 | Flood | |
| 7,043,339 B2 | 5/2006 | Maeda | |
| 7,274,975 B2 | 9/2007 | Miller | |

(Continued)

*Primary Examiner* — Darrin D Dunn
(74) *Attorney, Agent, or Firm* — Standley Law Group LLP; Adam J. Smith; Bryan P. Finneran

(57) ABSTRACT

A decentralized control system with adjustable operations includes control devices for arrangement at a system for undertaking. When so arranged, the control devices determine a measurement of a control parameter at a respective one of the control devices, and electronically share the measurement with other one or ones of the control devices such that each of the control devices receive measurements from a different one or combination of the control devices. Upon receipt of an out-of-tolerance measurement from any other of the control devices, the respective one of the control devices adjusts its operational setpoint and/or sends a signal to a same and/or different other one or ones of the control devices to adjust their operational setpoint.

18 Claims, 3 Drawing Sheets

(56) References Cited

U.S. PATENT DOCUMENTS

| | | |
|---|---|---|
| 7,561,977 B2 | 7/2009 | Horst |
| 7,809,472 B1 | 10/2010 | Silva |
| 8,036,779 B2 | 10/2011 | Ito |
| 8,214,061 B2 | 7/2012 | Westrick |
| 8,229,559 B2 | 7/2012 | Westendrop |
| 8,229,599 B2 | 7/2012 | Nishino |
| 8,359,112 B2 | 1/2013 | Kephart |
| 8,676,219 B2 | 3/2014 | Pratt |
| 8,738,546 B2 | 5/2014 | Basak |
| 8,762,666 B2 | 6/2014 | Grohman |
| 8,788,097 B2 | 7/2014 | Drees |
| 8,897,923 B2 | 11/2014 | Haynes |
| 9,160,169 B2 | 10/2015 | Hanks |
| 9,194,601 B2 | 11/2015 | Kuroiwa |
| 9,256,217 B2* | 2/2016 | Washington ......... G05B 19/042 |
| 9,429,927 B2 | 8/2016 | Nesler |
| 9,835,347 B2 | 12/2017 | Asmus |
| 9,874,885 B2 | 1/2018 | Shetty |
| 10,001,290 B2 | 6/2018 | Toriyama |
| 10,055,268 B2 | 8/2018 | Veluswamy |
| 10,333,731 B2 | 6/2019 | Ebrom et al. |
| 10,641,512 B2 | 5/2020 | Otsuki |
| 10,764,331 B2 | 9/2020 | Hoole et al. |
| 10,816,942 B2 | 10/2020 | Ghosh |
| 10,848,565 B1 | 11/2020 | Hobgood et al. |
| 10,928,085 B2 | 2/2021 | Gyota |
| 11,060,749 B2 | 7/2021 | Hur |
| 11,218,298 B2 | 1/2022 | Neumann |
| 11,536,475 B2 | 12/2022 | Ohta |
| 11,555,625 B2 | 1/2023 | Murakami |
| 11,815,277 B2* | 11/2023 | Basterash ............. G05B 15/02 |
| 2003/0050738 A1 | 3/2003 | Masticola |
| 2004/0215529 A1 | 10/2004 | Foster |
| 2006/0282195 A1 | 12/2006 | Robinson |
| 2008/0039977 A1 | 2/2008 | Clark |
| 2008/0178615 A1 | 7/2008 | Yoon |
| 2008/0185448 A1 | 8/2008 | Kim |
| 2008/0234869 A1 | 9/2008 | Yonezawa |
| 2008/0272934 A1 | 11/2008 | Wang |
| 2009/0187499 A1 | 7/2009 | Mulder |
| 2009/0240381 A1 | 9/2009 | Lane |
| 2010/0101663 A1* | 4/2010 | Granborg ................ F16L 53/34 |
| | | 219/535 |
| 2010/0217651 A1 | 8/2010 | Crabtree |
| 2011/0251730 A1 | 10/2011 | Pitt |
| 2012/0053737 A1 | 3/2012 | Valluri et al. |
| 2012/0065791 A1 | 3/2012 | Besore et al. |
| 2012/0101651 A1 | 4/2012 | Haynes |
| 2012/0253521 A1* | 10/2012 | Storm .................... G05B 15/02 |
| | | 236/51 |
| 2012/0310377 A1 | 12/2012 | Prentice |
| 2013/0066482 A1 | 3/2013 | Li |
| 2013/0121704 A1 | 5/2013 | Gall |
| 2013/0144451 A1 | 6/2013 | Kumar |
| 2014/0060064 A1 | 3/2014 | Agostinelli et al. |
| 2014/0277760 A1 | 9/2014 | Marik et al. |
| 2014/0289321 A1 | 9/2014 | Fata et al. |
| 2014/0324973 A1* | 10/2014 | Goel ....................... H04W 4/08 |
| | | 709/204 |
| 2014/0358285 A1 | 12/2014 | Aggarwal |
| 2015/0167997 A1 | 6/2015 | Saffre et al. |
| 2015/0308903 A1 | 10/2015 | Sohn et al. |
| 2016/0072287 A1 | 3/2016 | Jia |
| 2016/0109146 A1 | 4/2016 | Zhang |
| 2016/0124411 A1 | 5/2016 | Tinnakornsrisuphap et al. |
| 2016/0127173 A1 | 5/2016 | Gagnon et al. |
| 2016/0305678 A1 | 10/2016 | Pavlovski et al. |
| 2017/0220502 A1 | 8/2017 | Kessler et al. |
| 2017/0237289 A1 | 8/2017 | Thompson |
| 2017/0356450 A1 | 12/2017 | Cheng |
| 2017/0372244 A1 | 12/2017 | Westergaard |
| 2018/0100663 A1 | 4/2018 | Crimins et al. |
| 2018/0328615 A1* | 11/2018 | Lo .......................... F24F 11/745 |
| 2019/0017720 A1* | 1/2019 | Otsuki .................... F24F 11/65 |
| 2019/0041817 A1* | 2/2019 | Kohn ..................... B60W 10/08 |
| 2019/0197635 A1 | 6/2019 | Kim |
| 2019/0385248 A1 | 12/2019 | Matsuoka |
| 2020/0235833 A1 | 7/2020 | Zhu |
| 2020/0292210 A1 | 9/2020 | Powell |
| 2020/0386428 A1 | 12/2020 | Matthys |
| 2021/0072776 A1 | 3/2021 | Honda |
| 2021/0223762 A1* | 7/2021 | Stay ................. G05B 19/41845 |
| 2022/0003447 A1* | 1/2022 | Williams ................. F24F 11/46 |
| 2022/0123946 A1 | 4/2022 | Knopf |
| 2022/0268474 A1 | 8/2022 | Okada |
| 2022/0299234 A1* | 9/2022 | Basterash ............... F24F 11/38 |
| 2022/0341610 A1 | 10/2022 | Maeda |
| 2022/0374876 A1* | 11/2022 | Walters ............. G06Q 20/3825 |
| 2023/0092550 A1 | 3/2023 | Rognli et al. |
| 2023/0113369 A1* | 4/2023 | Wang ................... H04L 65/4053 |
| | | 709/204 |
| 2024/0302824 A1 | 9/2024 | Alaghehband et al. |

* cited by examiner

SUBSIDIARY INTERACTION OF CONTROLLERS

CROSS-REFERENCE TO RELATED APPLICATIONS

This application is a continuation of US non-provisional application Ser. No. 17/640,141 filed Mar. 3, 2022, which is a national stage entry of PCT/US2020/049199 filed Sep. 3, 2020, which claims the benefit of US provisional application 62/896,055, filed Sep. 5, 2019; the disclosures of each of the foregoing are incorporated by reference as if fully restated herein.

TECHNICAL FIELD

This invention relates to methods and systems of control devices arranged along a system under control, so that the individual control devices interact locally with at least one adjacent control device in a subsidiary manner, resulting in overall control of the system being maintained even if communication with a central control system fails. A particular embodiment covers temperature control along a pipeline.

BACKGROUND OF THE ART

Many systems can operate with a single system parameter being controlled by a single control device. However, when many control devices are within control of a central control unit, often remotely located, effective control can be lost if there is any disruption of the communication between the central control unit and the dispersed controllers.

It is an unmet need of the prior art to provide a control system in which a principle of subsidiarity is used to gang together local groups of control devices to locally react to system disruptions.

SUMMARY

These shortcomings of the prior art are overcome at least in part by a control arrangement for an operating system. The control arrangement comprises a plurality of control devices, arranged in the operating system in a sequential order, such that each control device shares information, comprising operational condition and a real-time measurement of at least one control parameter, with at least one control device in an upstream direction and at least one control device in a downstream direction.

In such a control arrangement, plurality of control devices further comprise a first and a second terminal control device. The first terminal control device is positioned at a beginning of the sequential order and the second terminal control device positioned at an end of the sequential order, such that the first terminal control device shares information only with control devices in the downstream direction and the second terminal control device shares information only with control devices in the upstream direction.

In some of the embodiments, each control device that is not a terminal control device shares information with at least two control devices in the upstream direction and at least two control devices in the downstream direction.

In some of any of these embodiments, the control devices are heating systems and the control parameter is temperature.

In such systems, each of the heating systems comprises a thermostat; a length of heat tracing line provided with electrical power through the thermostat; and a temperature sensor in contact with an object being heated by the length of heat tracing, the temperature sensor providing a feedback input to the thermostat.

BRIEF DESCRIPTION OF THE DRAWINGS

A better understanding of the inventive concept will be had by reference to the appended drawings, wherein identical reference numbers identify identical parts and wherein.

DETAILED DESCRIPTION OF THE PREFERRED EMBODIMENTS

Figure 1A:
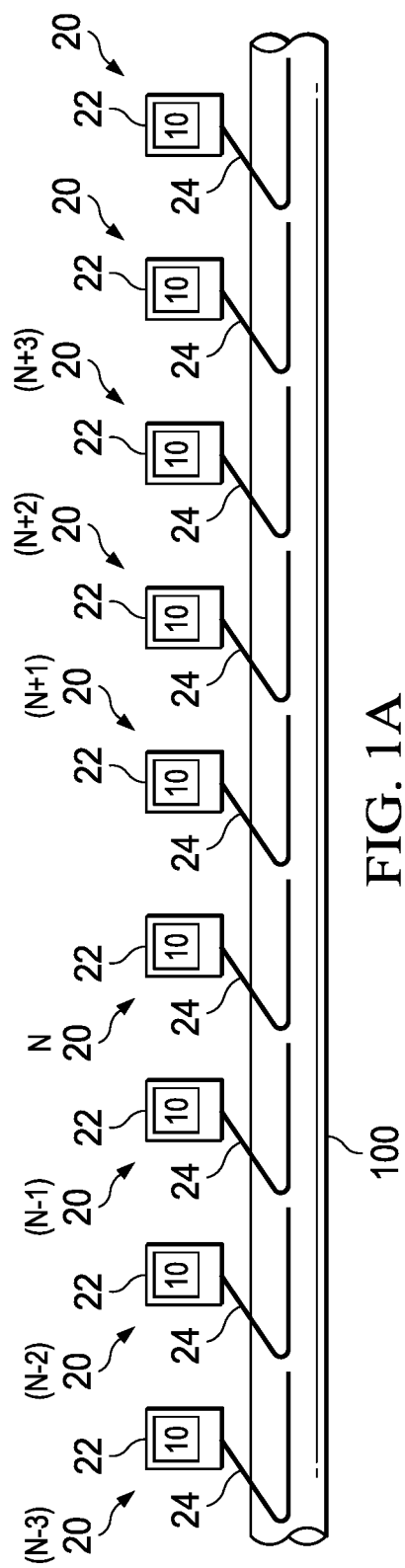
FIG. 1A shows a system of control devices as known in the prior art, implemented on a pipeline under normal operation.
Figure 1B:
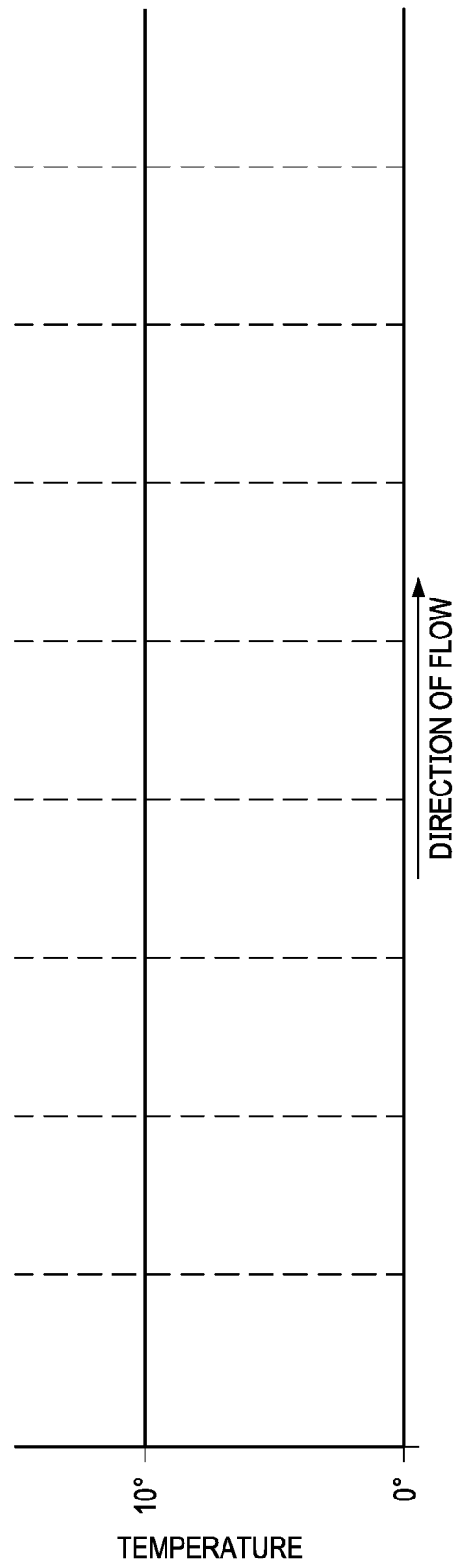
FIG. 1B shows a temperature versus distance diagram for the system of FIG. 1A.
Figure 2A:
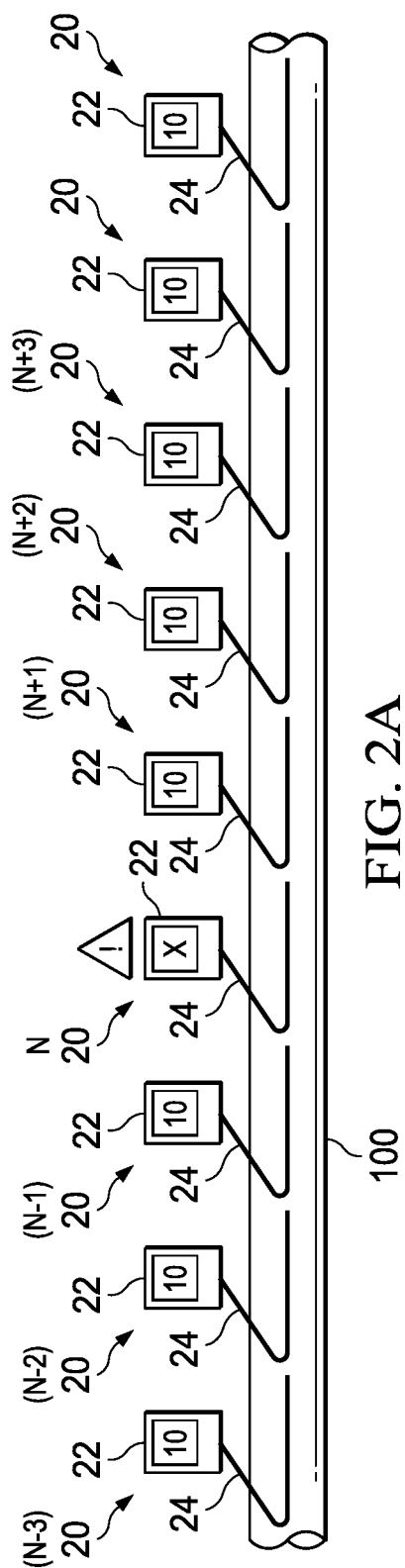
FIG. 2A shows the system of control devices of FIG. 1A, wherein a disruption has occurred in a control device in the system.
Figure 3A:
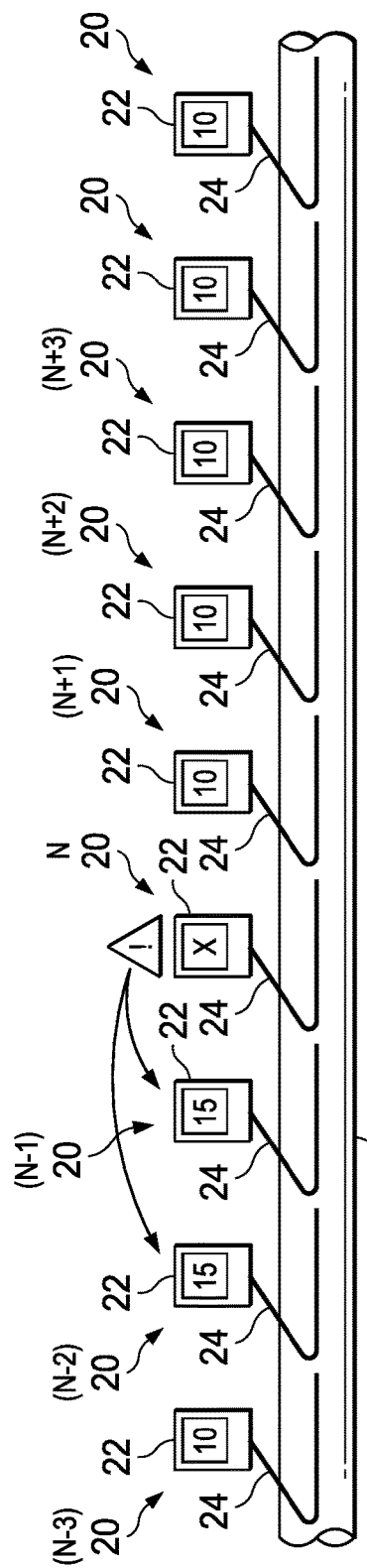
FIG. 3A shows a system of control devices incorporating the inventive concept under the same disruption as depicted in FIG. 2A.

FIG. 1A schematically depicts a section of a pipeline 100. A plurality of heating systems 20 are arranged sequentially along the pipeline 100. Each heating system 20 has a thermostat 22 and a length of heat tracing line 24. In a hypothetical such as this, the systems 20 may be arranged at intervals of approximately 200 meters. A sensor 24 is in contact with the pipeline 100 and detects a temperature of the pipeline skin, which the sensor provides as an input signal to the thermostat 22, so that the power supplied to the heat tracing 24 may be controlled. In many of the systems of this type, power is applied to maintain a setpoint temperature. In the specific illustrative example, FIG. 1B shows how temperature varies with distance along the pipeline 100 when the system is operating ideally, with the setpoint at 10° C. In actual practice, the extremely flat horizontal slope of the temperature profile is not achieved, although the excursions are probably sufficiently minimal that they may be ignored. FIG. 1B also shows a baseline at 0° C., as this a freezing temperature for water. Operation as depicted in FIGS. 1A and 1B is trivial as long as each and every heating system 20 operates nominally. In FIGS. 1A, 2A and 3A, flow of the material in the pipeline 100 is from left to right, so seven of the heating systems 20 are numbered as (N−3), (N−2), (N−1), N, (N+1), (N+2) and (N+3) for purposes of illustration.

Figure 2B:
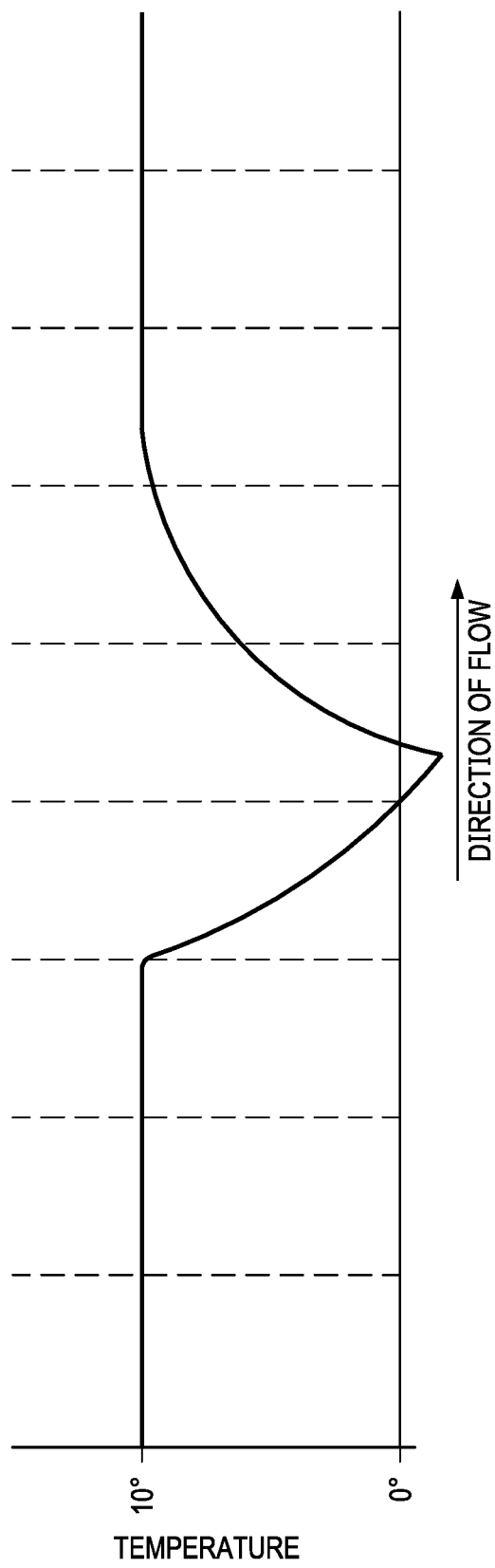
FIG. 2B shows a temperature versus distance diagram for the system of FIG. 2A, as disrupted.

A complication can arise if one or more of the heating systems 20, in this case the heating system 20 numbered as N fails to maintain the setpoint temperature. This failure, illustrated in FIG. 2A, can occur from a variety of means, but assume it is due to a fault in the power line supplying the heat tracing 24. When this occurs, as depicted graphically in FIG. 2B. temperature in the pipeline segment controlled by heating system N drops. Since the heating systems denominated as (N−1) and (N+1), that is, the adjacent heating systems, are unaware of the fault. Depending on the circumstances, pipeline temperature could drop below 0° C. and adverse results could occur. As long as heating systems 20 denominated as (N+1) and up continue to function, recovery can occur, but it may take a long distance to restore the temperature to the setpoint.

One prior art solution (not illustrated) to avoid this problem is to connect each heating system with a central controller using a communication system (e.g. Modbus) to monitor and control it. Even this system can fail if a loss in signal, to or from the heating system, occurs.

Figure 3B:
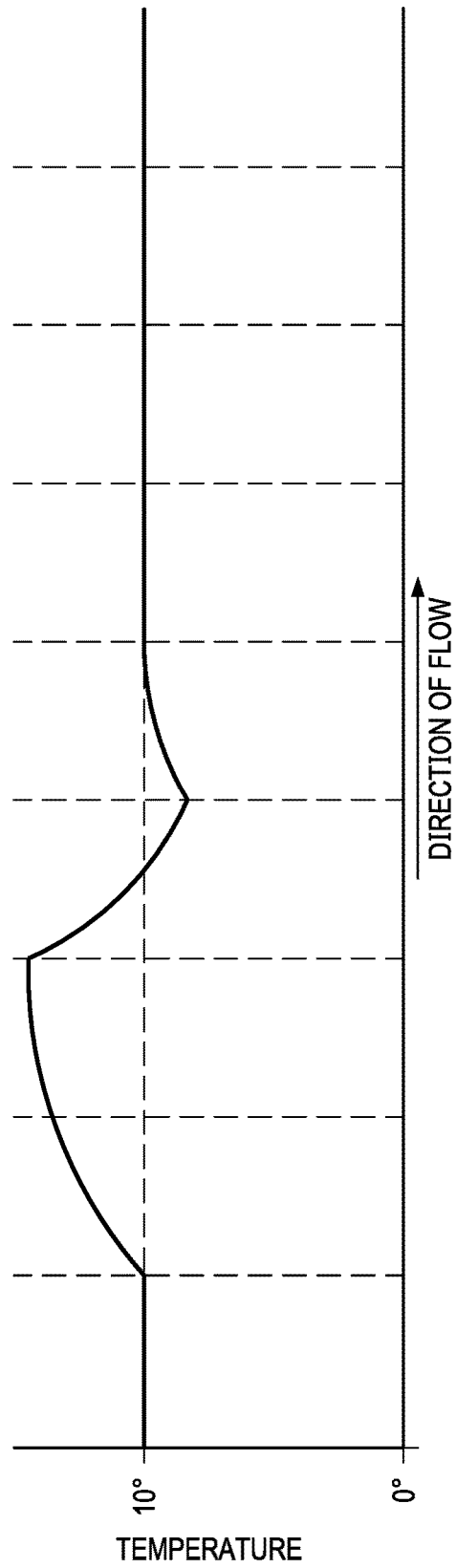
FIG. 3B shows a temperature versus distance diagram for the system of FIG. 3B, showing the effects of the subsidiary control protocol.

The inventive concept is seen in FIGS. 3A and 3B. As the temperature begins to drop in the zone of thermostat N, one of at least a few algorithms can be followed. In one of these algorithms, thermostat N receives a signal from its associated sensor and recognizes a decrease in temperature. This causes it to send a signal to at least the thermostat immediately upstream from it, that is, thermostat (N−1), that requires thermostat (N−1) to increase its setpoint by a predetermined amount. Thermostat (N−1) may also send a signal to thermostat (N−2) that requires it to increase its setpoint by a predetermined percentage of the setpoint increase that has occurred in thermostat (N−1).

In another variation of this algorithm, thermostat N, receiving a signal from its associated sensor, recognizes that the sensed temperature differs from the temperatures being sensed at the immediately adjacent temperature zones, that is, zones (N+1) and (N−1). If the difference exceeds a predetermined threshold, thermostat N sends a corrective signal in the appropriate direction. In this case, thermostat N instructs thermostat (N−1) to increase its setpoint by a predetermined amount. Thermostat (N−1) may in turn send a signal to thermostat (N−2) that requires it to increase its setpoint, based upon a comparison of the sensor signals from thermostats N and (N−2) using the same concept of comparing three spatially sequential temperatures signals, that is, the signals from thermostats (N−2), (N−1) and N.

The algorithm can extend to a situation where each thermostat in the system shares condition status information with each other thermostat. However, for practical purposes, the value of information from a remote thermostat declines significantly. For that reason, a practical limit may be to have every thermostat directly being informed by no more than four thermostats in the upstream direction and no more than four thermostats in the downstream direction. It is readily understood that the most remote of these thermostats will convey information indirectly through their connection to additional thermostats not in direct communication with the "central" thermostat in this regime.

A conventional thermostat receives a temperature signal and calculates a power output signal that is based on the temperature signal as converted to temperature and a set temperature. This system is operative regardless of whether the thermostat is a two point controller, a PID controller, a fuzzy controller, a neuro controller or another known type. When the inventive concept is applied, the additional information from additional thermostats in increasing distances upstream and downstream of the central or operating thermostat is received and appropriately discounted, based on distance (in terms of number of units) and direction (upstream or downstream). These data may be stored and used for tracking trends. This information can be usefully implemented in any of the types of controllers mentioned above.

As an example, thermostat N may operate in a standard manner if the condition data for thermostats N+1 and N+2 are unremarkable. However, if either thermostat N+1 or N+2 fails, by not reporting or indicating error, the set point in thermostat N may be raised by a predetermined amount. In another variation, if thermostat N+2 fails, the data from thermostat N+3, which might be otherwise ignored, is used in lieu of thermostat N+2. In either of these cases, thermostat N may append an indicator to its condition output signal, so that the adjacent thermostats will recognize that non-standard operation is occurring.

Of course, thermostat N may also send a signal to a remotely-located control point that it has noted a temperature difference that may indicate a malfunction in its zone of operation.

While the inventive concept is described as implemented on a system of sequentially-arranged thermostats to control temperature in a pipeline, it will be understood by one of skill in the art that the same concept may be used to maintain local control in the subsidiary manner by establishing communication between at least one adjacent control device and sharing information about at least one control parameter and the real-time condition of the control device. While temperature is a control parameter used illustratively here, many other control parameters could be used, including, for example, pressure, humidity, dissolved gas concentration and pH.

What is claimed is:

1. A decentralized control system with adjustable operations, said decentralized control system comprising:
control devices configured for medial, sequential arrangement at a system for undertaking operations, and when so arranged, are configured to:
determine a measurement of a control parameter at a respective one of the control devices;
adjust an amount of energy applied by the respective one of the control devices to the system based, at least in part, on the measurement of the control parameter at the respective one of the control devices relative to an operational setpoint of the respective one of the control devices;
electronically share the measurement with other one or ones of the control devices such that each of the control devices receive measurements exclusively from a different one or combination of the control devices, including from at least one, but less than all, of the control devices upstream of the respective one of the control devices in the sequential arrangement and at least one, but less than all, of the control devices downstream of the respective one of the control devices in the sequential arrangement;
upon receipt of an out-of-tolerance measurement from any other of the control devices at the respective one of the control devices, adjust the operational setpoint of said respective one of the control devices, and send a signal to a same and/or different other one or ones of the control devices to adjust the operational setpoint of such one or ones of the control devices; and
adjust the amount of energy applied by the respective one of the control devices to the system based, at least in part, on a same or subsequent measurement of the control parameter at the respective one of the control devices relative to the adjusted operational setpoint of the respective one of the control devices.

2. The decentralized control system of claim 1 wherein:
each of the control devices comprise a heating system or a pump; and
the measurement comprises a temperature or a pressure.

3. The decentralized control system of claim 2 wherein:
each of the control devices comprise the heating system;
the measurement comprises the temperature;
each of the heating systems comprises a thermostat, a length of heat tracing line provided with electrical power by way of the thermostat, and a temperature sensor in contact with an object of the system to be heated by the length of heat tracing line; and the temperature sensor is electrically connected to the thermostat to a feedback input to the thermostat.

4. The decentralized control system of claim 1 further comprising:

terminal control devices, wherein a first one of the terminal control devices is positioned at a beginning of the sequential arrangement and a second one of the terminal control devices positioned at an end of the sequential arrangement, and wherein the first one of the terminal control devices electronically shares information only with the control devices upstream in the sequential arrangement and the second one of the terminal control devices electronically shares information only with the control devices downstream in the sequential arrangement.

5. The decentralized control system of claim 4 wherein: each of the control devices electronically shares information with at least four other of the control devices; and each of the terminal control devices electronically shares information with at least two of the control devices.

6. The decentralized control system of claim 1 wherein: each of the control devices is configured to determine the adjustment to the operational setpoint based, at least in part, on the out-of-tolerance measurement.

7. The decentralized control system of claim 1 wherein: each of the control devices is configured to find the out-of-tolerance measurement where a value for the control parameter is received from the other one or ones of the control devices that is different from the measurement of the control parameter at the respective one of the control devices by at least a predetermined margin.

8. The decentralized control system of claim 1 wherein: the same and/or different other one or ones of the control devices comprises the control device from which the out-of-tolerance measurement originated.

9. The decentralized control system of claim 1 wherein: the same and/or different other one or ones of the control devices comprises only different one or ones of the control devices from which the out-of-tolerance measurement originated.

10. The decentralized control system of claim 9 wherein: the out-of-tolerance measurement comprises a lack of data signal for at least a predetermined period of time.

11. The decentralized control system of claim 9 wherein: the out-of-tolerance measurement comprises an error message.

12. The decentralized control system of claim 1 wherein: each of the control devices is configured to:

determine an operational status of itself; and
upon receipt of a non-functionality indication from any other of the control devices at the respective one of the control devices, adjust the operational setpoint of said respective one of the control devices and/or send the signal to the same and/or different other one or ones of the control devices to adjust the operational setpoint of the other one or ones of the control devices.

13. The decentralized control system of claim 1 wherein: each of the control devices are configured to determine the measurement in real-time.

14. The decentralized control system of claim 1 wherein: each of the control devices is configured to adjust the operational setpoint of said respective one of the control devices a predetermined amount and send the signal to the same and/or different other one or ones of the control devices to adjust the operational setpoint of the same and/or different other one or ones of the control devices by at least a percentage of the predetermined amount.

15. The decentralized control system of claim 1 further comprising:

a central control device in electronic communication, at least indirectly, with the control devices and configured to issue operational signals to some or all of the control devices.

16. The decentralized control system of claim 1 wherein: one of the control devices is designated as a central or operating control device which is in electronic communication, at least indirectly, with the control devices and configured to issue operational signals to some or all of the control devices.

17. A decentralized control system with adjustable operations, said decentralized control system comprising:

control devices arranged sequentially at a system undertaking operations, each comprising a sensor and an energy application element, wherein each of the control devices is configured to: determine a measurement of a control parameter at a respective one of the control devices based, at least in part, on data received from the sensor of the respective one of the control devices;

apply a predetermined level of energy or refrain from applying the energy to the system by way of the energy application element of the respective one of the control devices based, at least on part, on the measurement relative to an operational setpoint of the respective one of the control devices;

electronically transmit the measurement to at least two other ones of the control devices in the sequential arrangement such that each of the control devices receive measurements of the control parameter exclusively from a different combination of the control devices, including at least one upstream one of the control devices and at least one downstream one of the control devices; and upon receipt of an out-of-tolerance measurement from any other of the control devices at the respective one of the control devices, adjust the operational setpoint of said respective one of the control devices and send a signal to a same and/or different other non-originating one or ones of the at least two other ones of the control devices to adjust the operational setpoint of such one or ones of the control devices; and control the predetermined level of energy applied to the system by way of the energy application element of the respective one of the control devices based, at least on part, on a same or subsequent measurement relative to the adjusted operational setpoint of the respective one of the control devices.

18. A method of providing decentralized control and adjustable operations for a system, said method comprising:

determining a measurement of a control parameter at a respective one of a plurality of control devices arranged sequentially at a system undertaking operations, where each of the control devices comprises a sensor and an energy application element, where the measurement is determined based, at least in part, on data received from the sensor of the respective one of the control devices;

applying a predetermined level of energy or refraining from applying the energy to the system by way of the energy application element of the respective one of the control devices based, at least on part, on the measurement relative to an operational setpoint of the respective one of the control devices;

electronically transmitting the measurement to other one or ones of the control devices in the sequential arrangement such that each of the control devices receive measurements of the control parameter exclusively from a different one or combination of the control devices, including at least one upstream one of the control devices and at least one downstream one of the control devices; and receiving of an out-of-tolerance measurement from a same or different an originating other one of the other control devices at the respective one of the control devices, and in response, perform one or both of:

adjust the operational setpoint of said respective one of the control devices; and adjust the predetermined level of energy applied to the system by way of the energy application element of the respective one of the control devices based, at least on part, on the measurement relative to the adjusted operational setpoint of the respective one of the control devices;

electronically transmit a signal to a same and/or different other one or ones of the other control devices to adjust the operational setpoint of such one or ones of the other control devices;

receive the out-of-tolerance measurement from the respective one of the control devices at the receiving control devices, and in response:

adjust an operational setpoint of said receiving control devices; and control an adjusted predetermined level of energy applied to the system by way of the energy application element of the receiving control devices based, at least on part, on a measurement of a control parameter at the receiving control devices relative to the adjusted operational setpoint.

* * * * *